3,375,002
VEHICLE SUSPENSION STRUT
Pearl L. Breon and Ralph H. Kress, Peoria, and Jackson C. Medley, East Peoria, Ill., assignors to Caterpillar Tractor Co., Peoria, Ill., a corporation of California
Filed Dec. 1, 1965, Ser. No. 510,836
4 Claims. (Cl. 267—65)

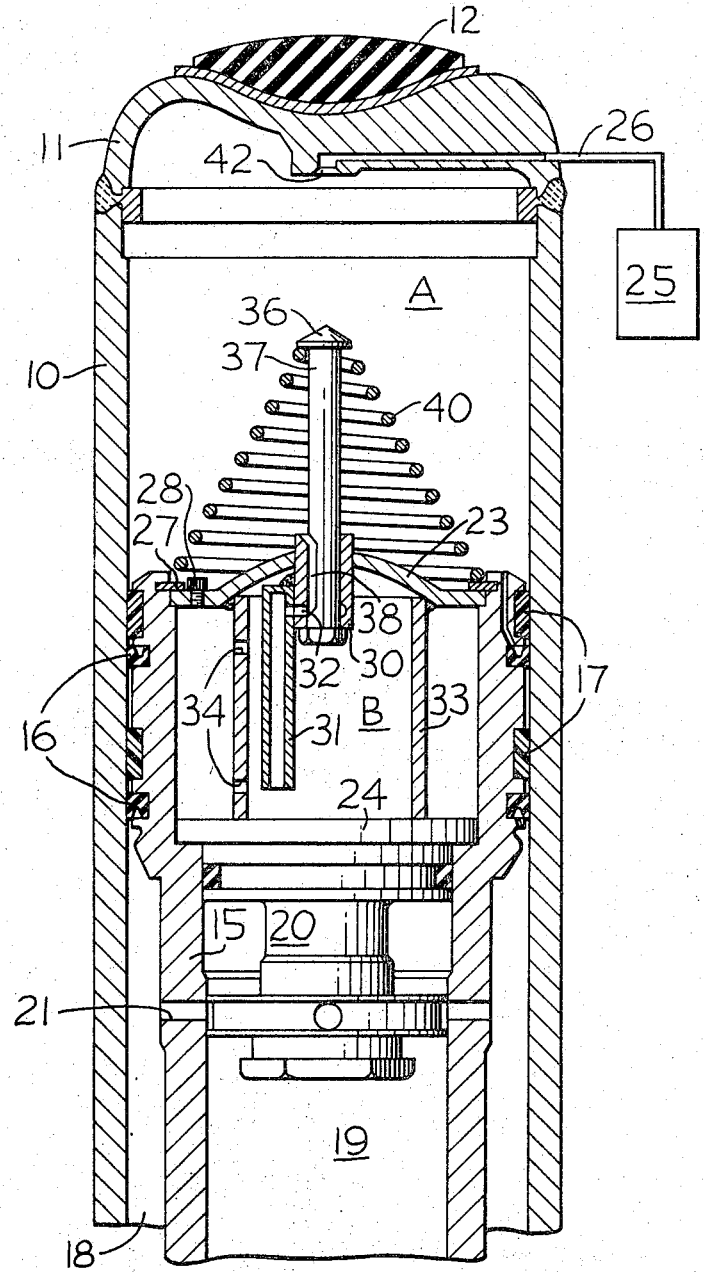

ABSTRACT OF THE DISCLOSURE

A suspension device for large vehicles having means for varying the stiffness or spring rate of a telescoping strut which utilizes air or gas as a cushioning means.

---

A strut of the kind to which the present invention pertains is shown, for example, in our assignee's copending application of Ralph H. Kress entitled "Suspension for Large Capacity Trucks," Ser. No. 488,986. Such struts are used between the body and running gear of a vehicle and contain gas which supports the weight of the body and load and is compressed in absorbing shocks to which the strut is subjected during operation of the vehicle. If the gas is held at a very high pressure, the vehicle rides badly and if the pressure is too low, so-called "bottoming" or metal-to-metal contact occurs between the piston and cylinder when heavy loads and severe shocks are encountered.

It is, therefore, desirable to have a variable gas pressure in a strut of this type and it is the object of the present invention to provide a strut in which the effective gas pressure and the spring rate will vary in response to variations in load and particularly peak or shock loads which might cause bottoming.

Further and more specific objects and advantages of the invention and the manner in which it is carried into practice are made apparent in the following specification wherein reference is made to the accompanying drawing.

The drawing is a central vertical section of the upper portion of a strut embodying the present invention.

The strut comprises a cylinder 10 with a head 11 welded thereto and in this particular design of strut, a rubber pad 12 is disposed on top of the head for directly supporting the body of the vehicle. A piston 15 reciprocably disposed within the cylinder has suitable seals 16 and guide rings 17 and is of reduced size below its upper end to provide an annular chamber 18. This chamber, as well as the hollow interior of the piston, forming a chamber 19, are filled with oil which, upon extension and contraction, surges from one chamber to the other through a rebound damping valve contained in a housing 20 and through orifice 21 in the wall of the piston. The function and construction of this valve are fully set forth in our assignee's application of Ralph H. Kress for "Vehicle Suspension Device," Ser. No. 418,192 and do not form a part of the present invention.

The upper end of the cylinder forms a chamber A and the upper end of the piston between a closure 23 and the top 24 of the valve housing 20 forms a second chamber B, both chambers being filled with air or other compressible fluid, nitrogen being a commonly used gas for this purpose. A passage 26 in the head of the cylinder communicates with an exterior chamber or vessel, shown schematically at a reduced scale at 25, containing the same gas so that under light loads downward movement of the cylinder or upward movement of the piston during operation of the vehicle compresses the gas in chambers A and B, as well as the external vessel.

The head 23 of the piston is secured in place by a snap ring 27 and a screw 28 which locks the snap ring against removal. Communication between the chambers A and B is provided through a valve guide 30 in the center of the closure 23 and a tube 31 communicating with the interior of the guide through a port 32. A cylinder 33 welded to the bottom of the closure 23 extends downwardly into contact with the upper end 24 of the housing 20 and retains the housing in position. Perforations such as shown at 34 permit communication between the interior and exterior of the cylinder 33.

A valve 36 has a stem 37 slidably disposed in the valve guide 30 and the stem is grooved as at 38 to provide communication between chamber A and the ports 32 which lead to chamber B when the valve is in its uppermost position as shown. A spring 40 retains the valve in this position during normal operation under light load. When the vehicle is very heavily loaded and the piston moves upwardly with respect to the head end of the cylinder sufficiently far for the valve 36 to seat in an orifice 42 at the inner end of the passage 26, communication between the outside gas vessel and the chambers A and B is cut off so that only the gas contained within the chambers A and B is compressed upon further load or shock. Consequently, the spring rate is increased because of the small volume of gas available for compression. Even with the strut operating under these conditions, heavy shocks might tend to move the piston upwardly until metal-to-metal engagement occurs which is destructive and undesirable. However, once the valve has closed the opening 42, further upward movement of the piston causes the guide 30 to move upwardly on the valve stem and close the passage formed by the notch 38 acting in the manner of a sleeve or sliding valve. With this passage closed, the only gas subject to compression is that in the chamber A. With only the chamber A in use, the spring rate is sufficiently high to prevent bottoming under the most severe shocks.

With the construction disclosed, a soft or low spring rate is maintained under all normal loads and increased under heavy loads and then subject to even greater increase for protection against the most severe shocks.

Referring back to description of the separate gas chambers A and B and the tube 31 which communicates between the chambers, it will be observed that the tube is not necessary to form communication between the chambers and it is provided for the following reason. A small supply of oil is provided in the chamber A for lubricating the rings and seals between the cylinder and piston. In the chamber B a small quantity of oil is provided to lubricate the moving parts in the valve 20. To insure against all of the oil in chamber A from being forced by air pressure or air flow down into the chamber B, the tube is caused to extend to a position just shortly above the bottom of the chamber B. Consequently high pressure in chamber B and flow from chamber B to A will carry oil with it and prevent a high level of oil from building up in chamber B.

We claim:
1. A vehicle suspension strut comprising a vertically disposed cylinder for attachment to a vehicle body, a piston reciprocable in the cylinder and attachable to the vehicle running gear, said cylinder having a closure at its upper end to provide a first gas chamber above the piston, said piston having a second gas chamber in its upper end, a passage for gas between the first and second chambers, and means operable upon relative movement of the piston upwardly in the cylinder to close said passage, the last means being a sliding valve normally resiliently held in an upward open position and engageable with the upper end of the cylinder to be moved downwardly to a closed position.

2. The combination of claim 1 with a third gas chamber outside of the cylinder, and means communicating the third gas chamber with the first gas chamber.

3. The combination of claim 2 in which the means communicating the first and third gas chambers includes an orifice in the upper end of the cylinder, and valve means carried by the piston for closing said orifice upon relative upward movement of the piston.

4. The combination of claim 3 in which the valve means carried by the piston is the upper end of said sliding valve whereby the orifice will first be closed to isolate the third gas chamber and upon continued relative upward movement the sliding valve will close to isolate the second gas chamber.

References Cited

FOREIGN PATENTS 74,313   11/1960   France.

ARTHUR L. LA POINT, *Primary Examiner.*

R. M. WOHLFARTH, *Examiner.*